(12) United States Patent
Holtzman et al.

(10) Patent No.: US 7,233,591 B2
(45) Date of Patent: *Jun. 19, 2007

(54) METHOD AND APPARATUS FOR CONTROLLING TRANSMISSION POWER IN A CDMA COMMUNICATION SYSTEM

(75) Inventors: Jack M. Holtzman, San Diego, CA (US); Tao Chen, San Dieogo, CA (US); Leonid Razoumov, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 10/901,881

(22) Filed: Jul. 28, 2004

(65) Prior Publication Data

US 2005/0002348 A1    Jan. 6, 2005

Related U.S. Application Data (63) Continuation of application No. 09/239,451, filed on Jan. 28, 1999, now Pat. No. 6,788,685.

(51) Int. Cl.
*H04L 12/28* (2006.01)
(52) U.S. Cl. .......................................... 370/391; 455/69
(58) Field of Classification Search ................ 370/391; 455/69
See application file for complete search history.

(56) References Cited

U.S. PATENT DOCUMENTS

| | | | |
|---|---|---|---|
| 5,396,516 A * | 3/1995 | Padovani et al. ............ 375/225 |
| 5,528,593 A * | 6/1996 | English et al. .............. 370/391 |
| 5,729,557 A * | 3/1998 | Gardner et al. ............. 714/774 |
| 5,974,327 A * | 10/1999 | Agrawal et al. ......... 455/452.2 |
| 5,982,760 A * | 11/1999 | Chen .......................... 370/335 |
| 5,991,285 A * | 11/1999 | Ghosh ........................ 370/335 |
| 6,070,085 A * | 5/2000 | Bender et al. .............. 455/522 |
| 6,137,840 A * | 10/2000 | Tiedemann, Jr. et al. ... 375/297 |
| 6,603,748 B1 * | 8/2003 | Lu et al. ..................... 370/329 |
| 6,697,375 B1 * | 2/2004 | Meng ......................... 370/465 |
| 6,788,685 B1 * | 9/2004 | Holtzman et al. .......... 370/391 |
| 6,928,268 B1 * | 8/2005 | Kroner ........................ 455/69 |

* cited by examiner

*Primary Examiner*—Doris H. To
*Assistant Examiner*—Phuongchau Ba Nguyen
(74) *Attorney, Agent, or Firm*—Thomas R. Rouse; Charles Brown; Kam T. Tam (57) ABSTRACT

Method and apparatus for controlling transmission power in a closed loop power control system, wherein power control commands are based on the energy of the previous power control commands. In one embodiment, the method compares changes in the received energy of received power control commands against expected changes in those commands based on previously transmitted power control commands, and identifies suspicious responses to said previously transmitted power control commands. Hypothesis testing of the received power control commands is performed accordance any identified suspicious responses.

18 Claims, 7 Drawing Sheets

METHOD AND APPARATUS FOR CONTROLLING TRANSMISSION POWER IN A CDMA COMMUNICATION SYSTEM

The present Application for Patent is a Continuation and claims priority to patent application Ser. No. 09/239,451 entitled "METHOD AND APPARATUS FOR CONTROLLING TRANSMISSION POWER IN A CDMA COMMUNICATION SYSTEM" filed Jan. 28, 1999, now U.S. Pat. No. 6,788,685, and assigned to the assignee hereof and hereby expressly incorporated by reference herein.

BACKGROUND OF THE INVENTION

I. Field of the Invention

The present invention relates to communications. More particularly, the present invention relates to a novel and improved method and apparatus for controlling the power of a CDMA transmitter.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

A method for transmission of speech in digital communication systems that offers particular advantages in increasing capacity while maintaining high quality of perceived speech is by the use of variable rate speech encoding. The method and apparatus of a particularly useful variable rate speech encoder is described in detail in U.S. Pat. No. 5,414,796, entitled "VARIABLE RATE VOCODER", assigned to the assignee of the present invention and incorporated by reference herein.

The use of a variable rate speech encoder provides for data frames of maximum speech data capacity when said speech encoding is providing speech data at a maximum rate. When a variable rate speech coder is providing speech data at a less than maximum rate, there is excess capacity in the transmission frames. A method for transmitting additional data in transmission frames of a fixed predetermined size, wherein the source of the data for the data frames is providing the data at a variable rate is described in detail in U.S. Pat. No. 5,504,773, entitled "METHOD AND APPARATUS FOR THE FORMATTING OF DATA FOR TRANSMISSION", assigned to the assignee of the present invention, of which the disclosure thereof is incorporated by reference herein. In the above mentioned patent application a method and apparatus is disclosed for combining data of differing types from different sources in a data frame for transmission.

In frames containing less data than a predetermined capacity, power consumption may be lessened by transmission gating a transmission amplifier such that only parts of the frame containing data are transmitted. Furthermore, message collisions in a communication system may be reduced if the data is placed into frames in accordance with a predetermined pseudorandom process. A method and apparatus for gating the transmission and for positioning the data in the frames is disclosed in U.S. Pat. No. 5,659,569, entitled "DATA BURST RANDOMIZER", assigned to the assignee of the present invention, of which the disclosure thereof is incorporated by reference herein.

A useful method of power control of a mobile in a communication system is to monitor the power of the received signal from the mobile station at a base station. The base station in response to the monitored power level transmits power control bits to the mobile station at regular intervals. A method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention, of which the disclosure thereof is incorporated by reference herein.

In a communication system that provides data using a QPSK modulation format, very useful information can be obtained by taking the cross product of the I and Q components of the QPSK signal. By knowing the relative phases of the two components, one can determine roughly the velocity of the mobile station in relation to the base station. A description of a circuit for determining the cross product of the I and Q components in a QPSK modulation communication system is disclosed in U.S. Pat. No. 5,506,865, entitled "PILOT CARRIER DOT PRODUCT CIRCUIT", assigned to the assignee of the present invention, the disclosure of which is incorporated by reference herein.

There has been an increasing demand for wireless communications systems to be able to transmit digital information at high rates. One method for sending high rate digital data from a remote station to a central base station is to allow the remote station to send the data using spread spectrum techniques of CDMA. One method that is proposed is to allow the remote station to transmit its information using a small set of orthogonal channels, this method is described in detail in U.S. Pat. No. 6,396,804, entitled "HIGH DATA RATE CDMA WIRELESS COMMUNICATION SYS- TEM", assigned to the assignee of the present invention and incorporated by reference herein.

SUMMARY OF THE INVENTION

The present invention is a novel and improved method and apparatus for controlling the transmission power in a closed loop power control system. In the present invention, power control commands punctured into the forward link traffic signal are used to determine the sufficiency of the energy of forward link traffic signal. In the present invention a novel method of closed loop power control is proposed which makes use of the energy of power control symbols, power control command estimations as well as traffic signal energy measurements to achieve greater accuracy of the closed loop power control system.

The drawback of using the power control symbols alone to determine the sufficiency of the traffic channel transmission energy is that there are not a lot of power control symbols and thus they are susceptible to the influence of the noise added to the power control symbols. This situation is further complicated because the energy of the power control symbols cannot simply be averaged together because they each may have been transmitted at different energies due to the response to power control commands. This situation is even further complicated because power control commands may be received incorrectly by the transmitting device.

The present invention provides effective methods of estimating signal quality of a received CDMA signal by means of combining power control symbol measurements and traffic channel estimations.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Introduction

Figure 1:
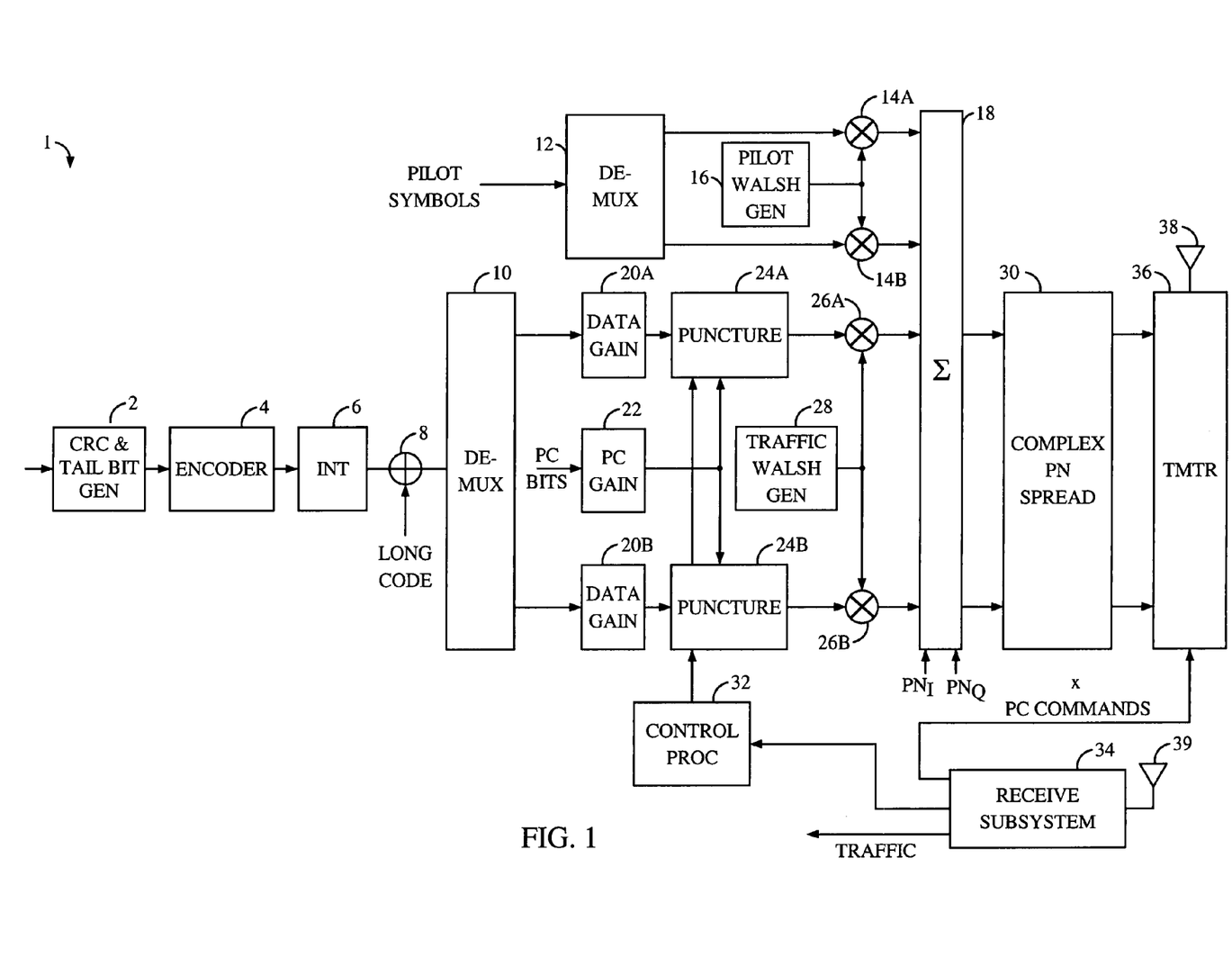
FIG. 1 is a block diagram of the base station of the present invention.

FIG. 1 illustrates the exemplary embodiment of the base station of the present invention. The present invention is described in terms of forward link power control. It will be understood by one skilled in the art that the present invention is equally applicable to reverse link power control. In addition, the present invention is equally applicable to any variable rate communication system employing closed loop power control. A frame of data is provided to CRC and tail bit generator 2. CRC and tail bit generator 2 generates and a set of cyclic redundancy check (CRC) bits and a set of tail bits and appends those bits to the input frame of data. The frame of data with CRC and tail bits is provided to encoder 4. Encoder 4 provides forward error correction coding on the frame of data including the CRC and tail bits. Encoder 4 could, for example, be a convolutional encoder or a turbo encoder or other forward error correction coder, the design and implementation of which are well known in the art.

The encoded symbols are then provided to interleaver 6, which reorders the encoded symbols in accordance with a predetermined interleaver format. In addition, interleaver 6 provides redundancy in the encoded symbols such that the resultant output consists of a fixed number of original encoded symbol versions and repeated versions of the encoded symbols. The reordered symbols are provided to spreading element 8, which scrambles the data in accordance with a long code pseudorandom sequence. The scrambled symbols are then provided to de-multiplexer 10. De-multiplexer 10 maps the symbols into a four point constellation consisting of (1,1), (1,−1), (−1,−1) and (−1,−1).

De-multiplexer 10 provides the symbols to data gain elements 20a and 20b. Data gain elements 20a and 20b adjust the energy of symbols on the two output signals and provide the gain adjusted signals to puncturing elements 24a and 24b, respectively. In the exemplary embodiment, the traffic data varies in transmission rate on a frame to frame basis. The transmission energy is varied in proportion to the data rate of the traffic data. For example, if a traffic data frame is transmitted at a predetermined maximum rate, then the signal containing the traffic data frame would be transmitted at a predetermined maximum transmission energy. If a traffic data frame was transmitted at a rate equal to half of the predetermined maximum rate, then the signal containing the traffic data frame would be transmitted at half of the predetermined maximum transmission energy, and so on. Because of the redundancy introduced by interleaver 6, the resulting symbol energy of the energy scaled signal remains constant.

Puncturing elements 24a and 24b insert reverse link power control bits into the gain adjusted data signals. The outgoing power control bits are provided to power control gain element 22. In the exemplary embodiment, the power control bits are always transmitted at the predetermined maximum transmission energy of the traffic channel regardless of the rate of the traffic data. Because the power control bits are not scaled in accordance with rate, these symbols offer a means of evaluating the sufficiency of the received traffic signal without knowledge of the rate of the traffic data. The gain adjusted power control bits are provided to puncturing elements 24a and 24b and are punctured into the outgoing traffic channels.

The signals from puncturing elements 24a and 24b are provided to a first input of orthogonal covering elements 26a and 26b. A traffic channel orthogonal covering sequence is generated by traffic Walsh generator 28. The Walsh sequence is provided to orthogonal covering elements 26a and 26b and provides an orthogonal covering on the outgoing traffic signal. The orthogonally covered traffic signal is provided to summer 18. For the sake of simplicity the generation of a single orthogonal traffic channel is illustrated. It will be understood by one skilled in the art that in commercial implementations, many more identically implemented traffic channels will also be present and supplying their orthogonally covered data to summer 18.

In the exemplary embodiment, a code division pilot is transmitted along with the traffic channels to allow for coherent demodulation of the transmitted traffic signals. Pilot symbols are provided de-multiplexer 12 which maps the pilot symbols into a four point constellation consisting of the points (1,1), (−1,1), (1,−1) and (−1,−1). In the exemplary embodiment, the pilot symbols consist of all zeroes. The resultant output streams from de-multiplexer 12 are provided to a first input of orthogonal covering elements 14a and 14b.

Pilot Walsh generator 16 generates a spreading function that is orthogonal to the spreading function used to spread the traffic channel data. In the exemplary embodiment, pilot Walsh generator 16 generates the Walsh(0) sequence and provides the sequence to a second input of covering elements 14a and 14b. Covering elements 14a and 14b cover the de-multiplexed pilot symbols in accordance with the pilot Walsh spreading function and provide the result to summer 18.

Summer 18 sums the pilot channel signal and all traffic channel signals and provides the resultant sum signal to complex PN spreading element 30. Complex PN spreading element 30 performs a spreading operation on the input sequences that balances the load on the in-phase and quadrature channels of the transmission. Complex PN spreading element 30 spreads the input signals I' and Q' in accordance with the equation:

$$I = PN_I \cdot I' + PN_Q \cdot Q' \quad (1)$$

$$Q = PN_I \cdot I' - PN_Q \cdot Q', \quad (2)$$

where $PN_I$ and $PN_Q$ are two psuedonoise sequences, the generation of which is well known in the art. The complex PN spread data sequences are provided to transmitter 36. Transmitter 36 upconverts, filters and amplifies the signals in accordance with a QPSK modulation format and provides the signal for transmission through antenna 38.

Signals from mobile stations in the coverage area of base station 1 are received at antenna 39 and provided to receive subsystem 34. Receive subsystem 34 demodulates and decodes the reverse link signals and outputs the demodulated and decoded signal. In addition, receive subsystem 34 provides a predetermined set of parameters to control processor 32. Control processor 32 determines the adequacy of the received signal energy of the reverse link signals from each of the mobile stations in communication with base station 1. Control processor 32 generates a set of power control commands in and provides the commands to puncturing elements 24a and 24b and operation proceeds as described above.

In addition, receive subsystem 34 receives power control commands from each mobile station in communication with base station 1. The power control commands indicate whether the base station should increase its traffic transmission energy to the particular mobile station sending the commands. The commands are received and provided to transmitter 36, which increases or decreases its transmission energy in response thereto. A detailed description of closed loop power control systems is provided in the aforementioned U.S. Pat. No. 5,056,109.

II. Power Control Based on Received Power Control Commands.

In the absence of noise and when power control commands are always received and responded to correctly, power control of the variable rate link can be greatly simplified. However, the deleterious effects of noise on a signal as a result of traversing the propagation path are unavoidable as are the incorrect reception and response to power control commands. The present invention is designed to deal with these additional complexities. However, before moving on to the description of the present invention, it is beneficial to understand the workings of a power control system in the absence of these complexities.

Figure 7A:
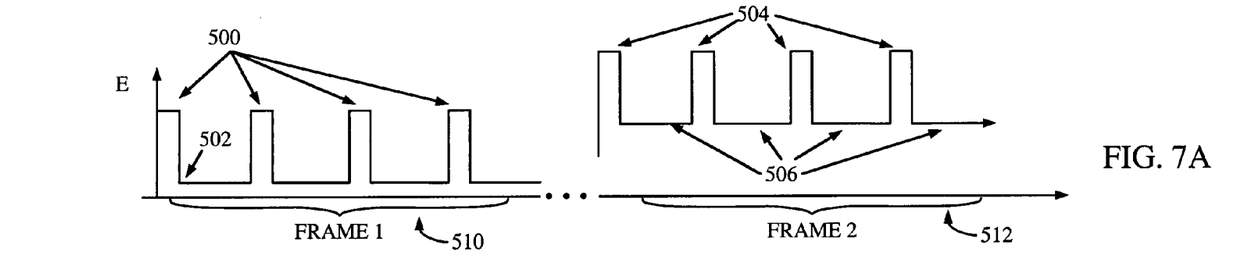
FIGS. 7A-7C illustrate the difficulties that are associated in adjusting the power control commands in order to average their energies.

Referring to FIG. 7A, FIG. 7A illustrates a received signal in which there is no added noise. In the first frame 510, the energy of the power control commands 500 are set to a predetermined energy equal to the transmission energy for a predetermined maximum rate. It will be understood by one skilled in the art that the energy of the power control commands need not be transmitted at the energy of the maximum rate signal, but rather need merely have a predetermined and known relationship to the energy of the maximum rate signal.

The traffic energy of each frame (502 and 506) varies based on the rate of the transmitted traffic data. Providing additional symbol redundancy in the signal allows the transmitter to reduce the energy of the transmitted traffic data. For example, if each symbol in the signal is transmitted twice, the energy at which each of the versions of the symbols is transmitted can be approximately halved. In this fashion, the total energy used to transmit the symbol is kept approximately constant. This method of proportionally reducing the transmission power of a signal in response to the introduction of redundancy into the signal is well known in the art, and is described in detail in the aforementioned U.S. Pat. No. 5,103,459.

In the present invention, the power control bits (500 and 504) remain at a constant energy that bears a known relationship to the energy of the maximum rate of the transmitted signal. Because the receiver of the present invention does not know a priori the rate of the transmitted signal, it uses the energy of the received power control bits to determine the adequacy of the energy of the received signal. This fixed point is important, because a signal received with redundancy may have adequate energy to provide for reliable reception of the signal, whereas the signal without symbol redundancy received at the same energy may have inadequate energy to provide reliable reception.

Because the receiver does not know the rate of the signal, or alternatively does not know the amount of symbol redundancy in the received signal, it cannot judge whether the received power is adequate for reliable reception. Thus, the power control commands transmitted with a fixed transmission power relationship to a known level of symbol redundancy provides a means by which the receiver can assess the adequacy of the received power without knowing the rate of the traffic data.

Referring back to FIG. 7A, a receiver receiving this signal in which the power control commands have no additive noise effects can determine the sufficiency of the energy of the received signal. In FIG. 7A, power control bits 500 are punctured into the variable rate traffic data 502. In a system without additive noise effects from the propagation path, the receiver computes the energy of a single received power control command 500 and compares this energy to threshold energy value. When the computed energy of the power control command 500 exceeds the threshold, the mobile communication device determines that the energy of the received signal exceeds the energy which is required for reliable reception and sends back to the transmitting communication device a command requesting that the transmitter reduce its transmission power. Conversely, when the computed energy of power control command 500 is below the threshold, the mobile communication device determines that the energy of the received signal is less than that which is required and sends back to the transmitting communication device a command requesting that the transmitter increase its transmission power. Although described in the context of simple up/down power control commands the teachings are easily extending to multi-bit power control commands that are indicative of the direction and amount of change in transmission power.

Figure 7B:
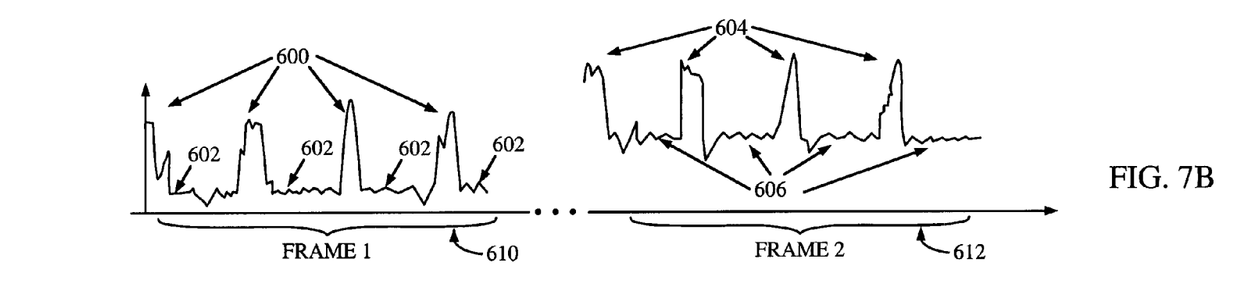

FIG. 7B introduces the additional complexity of additive noise into the received signal. When noise is introduced, it is no longer reliable to determine the sufficiency of the received signal using single power control bits. Power control bits are very short in duration and even minor changes in the propagation path can result in serious degradation of the received energy estimate.

When noise is added to the power control symbols 600, it is desirable to determine the received energy averaged across a plurality of power control bits 600 in order to reduce the effect of noise on the received power control bits 600. In its simplest form the power control bits 600 may simply be averaged together using a moving average filter to provide an improved estimate of the received energy. In a preferred embodiment, the more recently received power control symbols are emphasized. This combining can be performed using FIR filters or IIR filters the implementation and design of which are well known in the art.

Figure 7C:
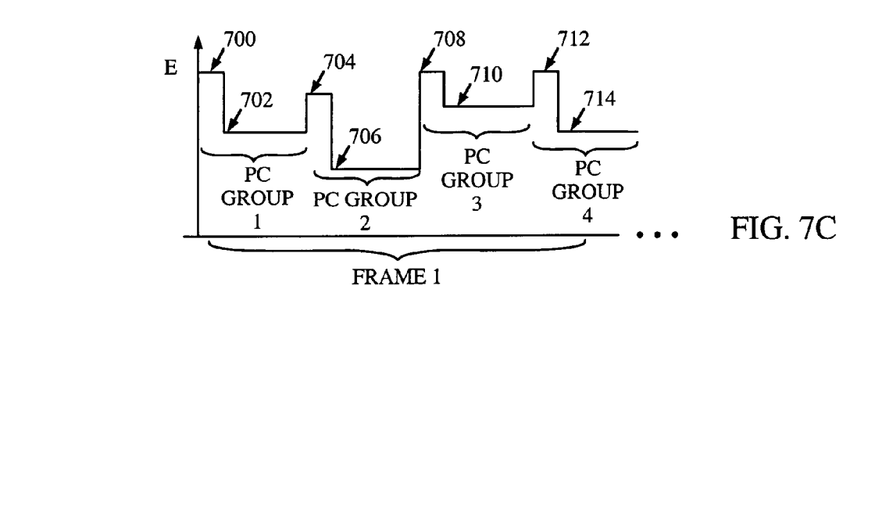

FIG. 7C illustrates the additional complexity wherein the transmission power of the transmitted signal varies in a known fashion in response to closed loop power control commands transmitted from the mobile station. For simplicity of illustration the noise effects illustrated in FIG. 7B have been removed. The noise effects would be present in any systems and the description will apply when noise is present and as described above are the motivation for averaging multiple power control commands prior to determining the adequacy of the received signal.

It is not appropriate in the determination of the adequacy of the received signal in FIG. 7C to simply average the energy of the received power control commands. This is because the transmission energies have varied in response to power control commands transmitted by the mobile station in addition to changes in the propagation path.

Power control command 700 and traffic symbols 702 make up a power control group (PC Group 1). That is to say, they were transmitted based on the same set of power control commands received at the base station. Similarly, power control command 704 and traffic symbols 706 comprise power control group 2 (PC Group 2), power control command 708 and traffic symbols 710 comprise power control group 3 (PC Group 3), and power control command 712 and traffic symbols 714 comprise power control group 4 (PC Group 4).

The mobile station knows the power control commands that have caused the changes in transmission power of the base station, because the mobile station transmitted those commands. In this simplified system, the assumption is that all power control commands transmitted by the mobile station are received correctly by the base station and responded to in a known fashion. Thus, the mobile station can remove the effects on the received power control commands that result from the closed loop power control system and thus can average the power control commands together in a meaningful way that reflects the changes in the propagation path alone.

In this simplified system, the base station transmitter increases its transmission power by $2\Delta$ when it receives an up command from the mobile station and decreases its transmission power by $\Delta$ when it receives a down command from the mobile station. Thus, when the mobile station is determining the adequacy of the received signal it first removes the effects of the closed loop power control from the received commands.

The mobile station knows that the base station reduced its transmission power between power control group 3 and power control group 4 in response to a down command it transmitted. Thus, prior to averaging power control command 712 with power control command 708, it reduces the received energy of power control command 708 by $\Delta$ to provide a normalized version of power control bit 708.

Similarly, the mobile station knows that it increased the transmission power of the base station between power control group 2 and power control group 3 so prior to averaging the energy of power control command 704 with the energy of power control bit 712 and the normalized energy of power control bit 708, the energy of power control bit 704 must be normalized. First the measured energy of power control bit 704 is decreased by $\Delta$ to deal with the change between power control group 3 and power control group 4 and then is increase by $2\Delta$ to deal with the change in transmission power between power control 2 and power control group 3. This results in a net summing of $\Delta$ to the measured energy of power control bit 704 prior to its inclusion of the power control bit energy average.

The energy of power control group 2 is less than the energy of power control group 1 in response to a down command transmitted by the mobile station. Thus, the power control group bit 700 is modified by adding $\Delta$, then subtracting $2\Delta$ and then adding $\Delta$, which results in leaving power control bit 700 unchanged. The normalized versions of power control bits 700, 704, 708 can then be combined or averaged with power control bit 712 and the assessment of the adequacy of the received signal energy can be performed as described with respect to FIG. 7B.

The situation is in general more complicated than that described with respect to FIGS. 7A-7C, because there is additive noise on the power control commands which are of short duration, and the power control commands sent by the mobile station may not have been received correctly by the base station or the base station may not respond to the power control commands as anticipated because it is using a different step size in response to those commands or because the base station is power saturated.

III. Power Control Command Correction/Adjustment

Figure 2:
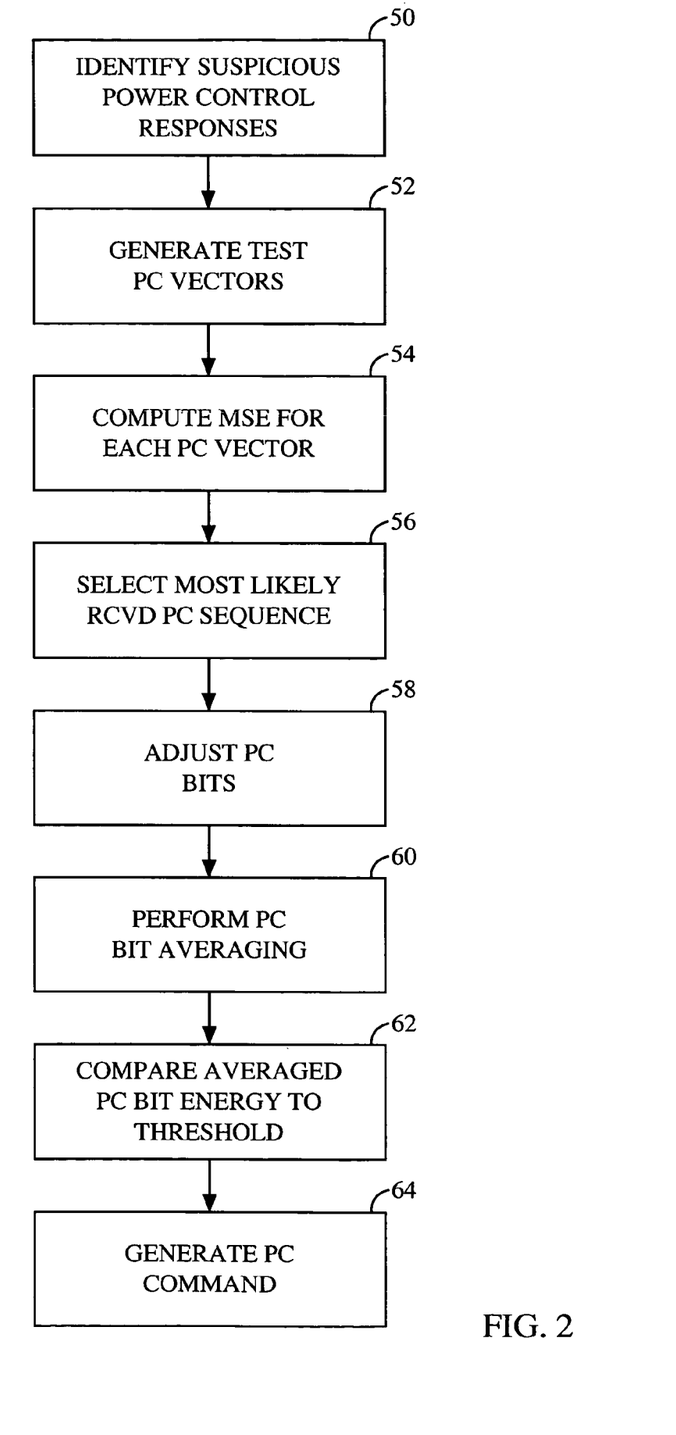
FIG. 2 is a flowchart illustrating the method for generating the power control commands of the first exemplary embodiment of the present invention.

FIG. 2 illustrates the first method of generating power control commands of the present invention. In the present invention, the power control commands that are punctured into the forward link traffic signal are used to determine the sufficiency of the forward link traffic signal. The power control commands are used because in the present invention their energy does not vary with the data rate of the traffic channel.

The drawback of using the power control commands alone to determine the sufficiency of the traffic channel transmission energy is that there are an insufficient number of power control commands and thus they are particularly susceptible to the influence of noise on the traffic channel. This situation is further complicated because the power control commands cannot simply be averaged together, because they may have been transmitted at different energy due to the response to power control commands from the mobile station. This situation is even further complicated because power control commands transmitted from the mobile station may be received incorrectly by the base station 1. The situation is further complicated because a station might choose to partially or totally ignore a power control command received from the mobile station. All the problems outlined above can be solved by means of the methods of the present invention.

Figure 3A:
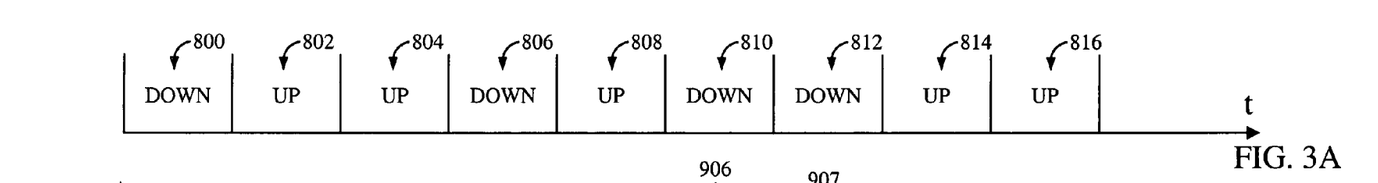
FIGS. 3A-3D illustrate the methods for generating the synthesized waveforms used to determine the power control bits of the present invention.
Figure 3B:
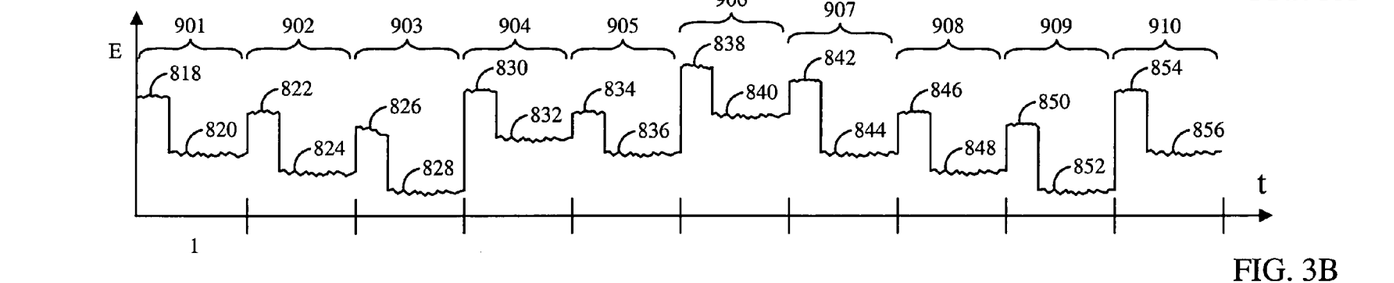
Figure 3C:
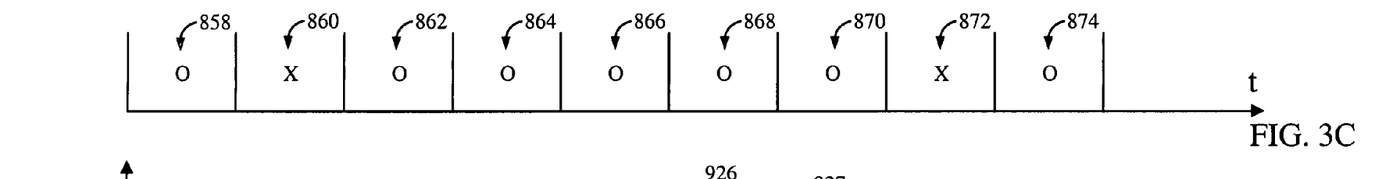

The mobile station can determine the delay between it and base station 1 and more particularly the mobile station knows the time interval between it transmitting a power control command and the mobile station receiving the forward link signals gain adjusted in response to the power control bits. In block 50, the mobile station identifies possibly incorrectly received power control commands. Turning to FIGS. 3A-3C, FIG. 3A reflects the order of power control commands transmitted by the mobile station. FIG. 3B illustrates the received forward link traffic signals adjusted in response to the power control commands illustrated in FIG. 3A. FIG. 3C illustrates the identification of suspicious responses by base station 1 to the power control commands transmitted by the mobile station.

In FIG. 3A, the sequence of power control commands transmitted by the mobile station. The mobile station first transmitted a "down" command 800, followed by "up" command 802, "up" command 804, "down" command 806, "up" command 808, "down" command 810, "down" command 812, "up" command 814 and "up command 816.

In FIG. 3B, the delayed received responses to the power control commands (as received) are illustrated. The first power control group comprises the reverse link power control command 818 and the forward link traffic data or pilot symbols 820. A power control group is defined herein as an interval of the forward link signal in which there are no changes to transmission energy within that interval. That is to say that the forward link transmitter has not varied its transmission energy based on any intervening power control commands over the interval of reverse link power control command 818 and the forward link traffic data or pilot symbols 820. In other words, the transmission energy of each power control group is based on the same set of received closed loop power control commands.

The first power control group in the forward link 901 consists of power control command 818 and traffic data or pilot symbols 820; the second power control group 902 consists of power control command 822 and traffic data or pilot symbols 824; the third power control group 903 consists of power control command 826 and traffic data or pilot symbols 828; the fourth power control group 904 consists of power control command 830 and traffic data or pilot symbols 832; the fifth power control group 905 consists of power control command 834 and traffic data or pilot symbols 836; the sixth power control group 906 consists of power control command 838 and traffic data or pilot symbols 840; the seventh power control group 907 consists of power control command 842 and traffic data or pilot symbols 844; the eighth power control group 908 consists of power control command 846 and traffic data or pilot symbols 848; the ninth power control group 909 consists of power control command 850 and traffic data or pilot symbols 852; and the tenth power control group 910 consists of power control command 854 and traffic data or pilot symbols 856.

In the exemplary embodiment, the power control group begins with a power control command and is followed by traffic data. This requires that the feedback rate of power control commands on the forward and reverse links be identical. The present invention is not limited to applications where the feedback rate of the forward and reverse link power control commands are the same. Moreover, there is no requirement that the power control commands being corrected be multiplexed into the traffic or pilot symbol data. These characteristics are simply put in for illustrative purposes to show the present invention applied to the proposed cdmda2000 RTT candidate submission.

The mobile station transmitted "Down" command 800 and monitors the forward link signal illustrated in FIG. 3B to identify the expected response to that command. Specifically, the mobile station anticipates a decrease in the energy between the power control group 901 and power control group 902 in response to the "Down" power control command 800. The mobile station anticipates an increase in the energy between power control group 902 and power control group 903 in response to the "Up" command 802. The mobile station anticipates an increase in the energy between power control group 903 and power control group 904 in response to the "Up" command 804. The mobile station anticipates a decrease in the energy between power control group 904 and power control group 905 in response to the "Down" command 806. The mobile station anticipates an increase in the energy between power control group 905 and power control group 906 in response to the "Up" command 808. The mobile station anticipates a decrease in the energy between power control group 906 and power control group 907 in response to the "Down" command 810. The mobile station anticipates a decrease in the energy between power control group 907 and power control group 908 in response to the "Down" command 812. The mobile station anticipates an increase in the energy between power control group 908 and power control group 909 in response to the "Down" command 814. The mobile station anticipates an increase in the energy between power control group 909 and power control group 910 in response to the "Up" command 816.

In FIG. 3C, suspicious changes in the received energy are flagged. Those that are suspicious are marked with an "X", while those appear to be consistent with the power control commands are marked with an "O". The change in received energy between power control groups 901 and 902 is consistent with "down" command 800, so this transition is marked as not suspicious in metric 858. The change in received energy between power control groups 902 and 903 is inconsistent with "up" command 802, so this transition is marked as suspicious in metric 860. The change in received energy between power control groups 903 and 904 is consistent with "up" command 804, so this transition is marked as not suspicious in metric 862. The change in received energy between power control groups 904 and 905 is consistent with "down" command 806, so this transition is marked as not suspicious in metric 864. The change in received energy between power control groups 905 and 906 is consistent with "up" command 808, so this transition is marked as not suspicious in metric 866. The change in received energy between power control groups 906 and 907 is consistent with "down" command 810, so this transition is marked as not suspicious in metric 868. The change in received energy between power control groups 907 and 908 is consistent with "down" command 812, so this transition is marked as not suspicious in metric 870. The change in received energy between power control groups 908 and 909 is inconsistent with "up" command 814, so this transition is marked as suspicious in metric 872. Lastly, the change in received energy between power control groups 909 and 910 is consistent with "up" command 816, so this transition is marked as not suspicious in metric 874.

In the preferred embodiment, traffic energies are used to identify the suspicious power control bits, because the total energy in all of the traffic symbols is greater than in the power control bits. For this use of traffic energies, the rate need not be known.

After identifying all suspicious power control bits, a set of test power control vectors are generated in block 52. Referring to FIG. 3C, it can be seen that the set of vectors to test would include four test vectors of potential power control commands as received by base station 1. The four potential power control command sets as received by base station 1 would include:

$$D\ U\ U\ D\ U\ D\ D\ U\ U\ D\ D\ U\ D\ U\ D\ D\ U\ U\ D\ U\ U \quad \quad (3)$$
$$D\ U\ D\ D\ D\ U\ D\ D\ U\ D\ U\ D\ D\ D\ U$$

These four possible sequences of receive power control commands would each then be tested to determine which sequence of power control commands would result in a transmission signal closest matching that received.

Figure 3D:
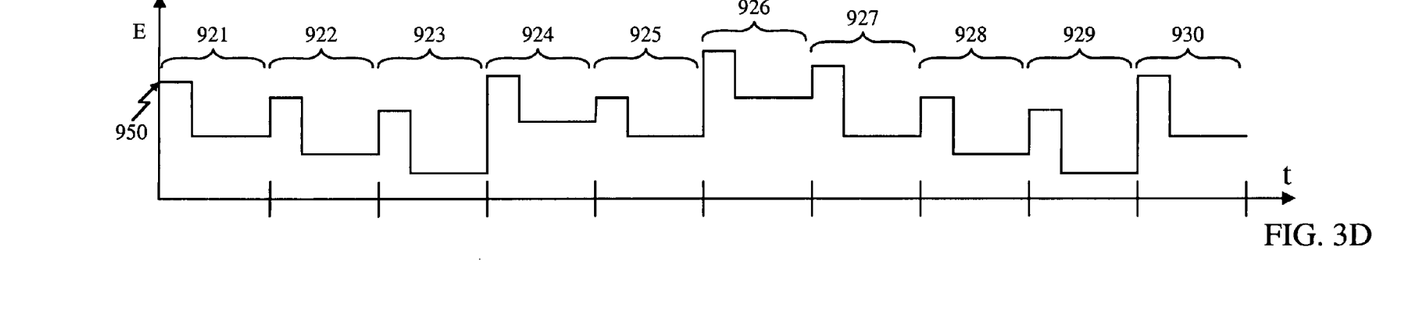

FIG. 3D illustrates the construction of a synthesized waveform based on the possible power control command sequences in equation (3) above. The mobile station attempts to determine a waveform that would most closely resemble the received waveform in FIG. 3B under different hypotheses regarding potential errors in the reception of power control commands by the base station.

In FIG. 3D illustrates an a test waveform based on the assumption that the second power control command 802 was received in error by the base station. Thus, a waveform is synthesized based on the hypothesis that the sequence of power control commands received by the base station was "Down", "Down", "Up", "Down", "Up", "Down", "Down", "Up", "Up". In testing the hypotheses, the mobile station knows the amount the base station will change its transmission energy in response to "up" and "down" power control commands. In the exemplary embodiment, a simple uniform energy change ($\Delta$) for both "up" and "down commands is presumed. In generating the test waveform power control group 922 is synthesized at an energy level $\Delta$ below the energy of power control 921. Power control group 923 is synthesized at an energy level $\Delta$ below the energy level of power control group 922, which test the hypothesis that the second power control command 802 was received in error. Under the assumption that the remaining power control commands were received correctly by the base station: power control group 924 is synthesized at an energy level $\Delta$ above power control group 923 reflecting the correct reception of power control command 804, power control group 925 is synthesized at an energy level $\Delta$ below power control group 924 reflecting the correct reception of power control command 806, power control group 926 is synthesized at an energy level $\Delta$ above power control group 925 reflecting the correct reception of power control command 808, power control group 927 is synthesized at an energy level $\Delta$ below power control group 926 reflecting the correct reception of power control command 810, power control group 928 is synthesized at an energy level $\Delta$ below power control group 927 reflecting the correct reception of power control command 812, power control group 929 is synthesized at an energy level $\Delta$ above power control group 928 reflecting the correct reception of power control command 814 and power control group 930 is synthesized at an energy level $\Delta$ above power control group 929 reflecting the correct reception of power control command 816.

The initial condition 950 is varied to determine the minimum mean squared error for each test hypothesis.

In block 54, the mean squared error (MSE) for between the test power control vectors and received traffic energies is computed. The means square error for the ith test power control vector (MSE(i)) is determined in accordance with the equation:

$$MSE(i) = \sum_{j=1}^{N} (s(j) - r(j))^2, \quad \quad (4)$$

where s(j) is the synthesized set of received power control groups based on hypothetically received power control commands generated by the test vectors as described with respect to block 52, and r(j) are the energies of the received power control groups.

The energy of the difference between the synthesized signal and the received signal is computed and stored. The initial energy is allowed to vary and the minimum mean squared error for all initial conditions for each vector is computed. In block 56, the sequence of power control commands that yields the lowest mean squared error between the synthesized signal and the received signal is selected.

In block 58, the power control commands are adjusted in accordance with the selected power control sequence. For example, assume that the power control sequence yielding the lowest mean square error is the sequence (D,U,U,D,U, D,D,U,U). Then in order to combine the power control commands received by the mobile station in a meaningful fashion the adjustments in the transmission power of the base station in response to those commands must be removed.

Assume that when an "Up" command is received from the mobile station, base station 1 increases the transmission energy of the traffic channel to the mobile station is increased by $\Delta$Pup. When a "Down" command is received from the mobile station, base station 1 increases the transmission energy of the traffic channel to the mobile station is decreased by $\Delta$Pdown. Assume that the energy of the current receive power control bit is Pi, then the adjusted energy of the prior power control bit should be PI-1+$\Delta$Pup since an up command was determined to have been received between the current power control command and the previous power control command. The energy of the power control bit received two power control intervals previous is adjusted as PI-2+2·$\Delta$Pup since two up commands were determined to have been received between the current power control command and the power control command bit received two power control groups earlier. This process of adjusting the power control bits continues to the power control bit received in the first power control group.

In block 60 the adjusted energy of the power control bits is averaged together to remove the effects of noise on the power control bits. In block 62, the average adjusted energy of the power control bit sequence is compared against a threshold. In block 64, if the average adjusted energy of the power control bit sequence is less than the threshold then a power control command indicating that the base station should increase the transmission energy of the traffic channel is generated. If the average adjusted energy of the power control bit sequence is greater than the threshold then a power control command indicating that the base station should decrease the transmission energy of the traffic channel is generated.

Figure 6:
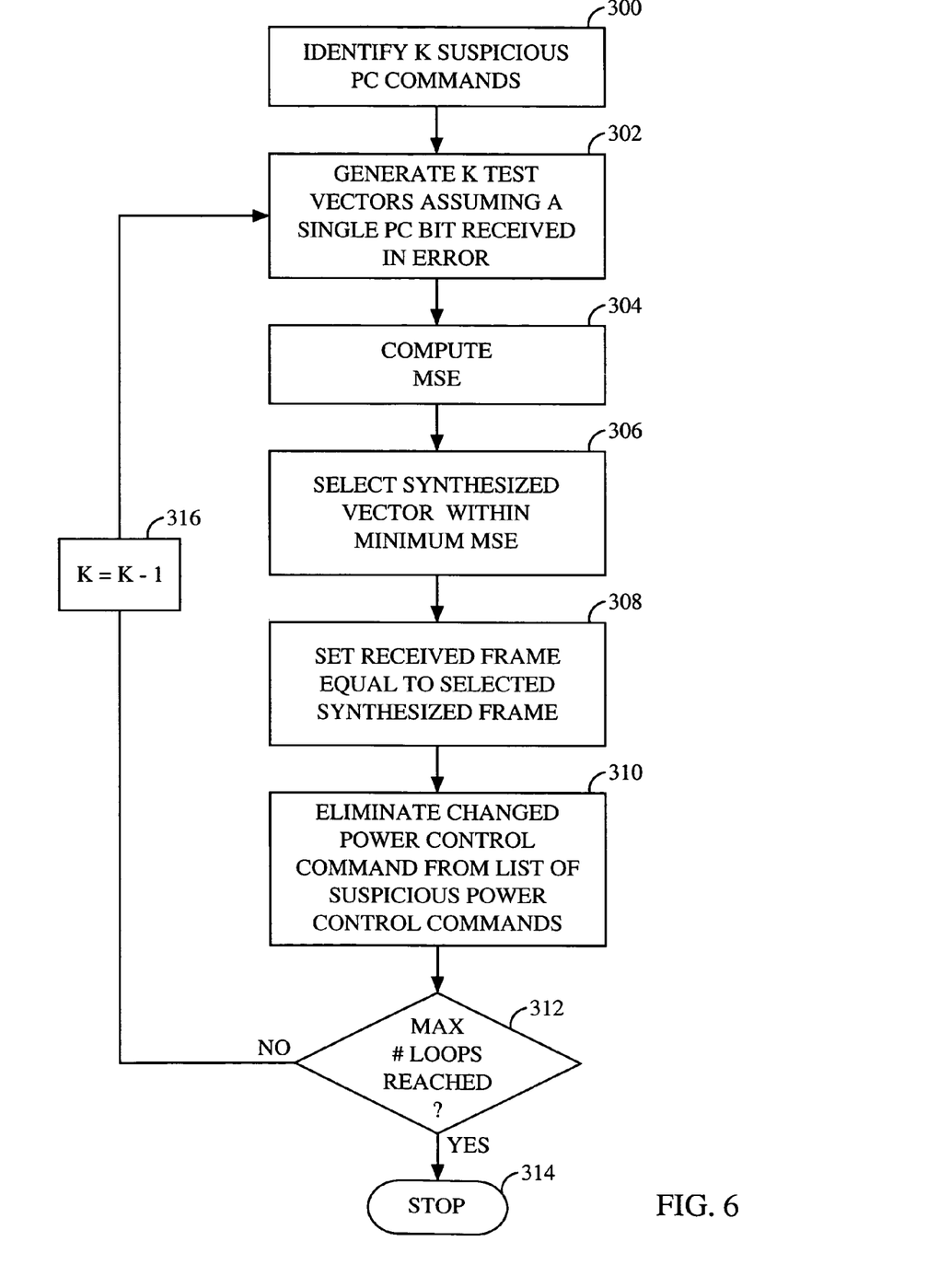
FIG. 6 is a flowchart illustrating a sub-optimal method for correcting the closed loop power control commands which reduces computational complexity.

FIG. 6 is a flowchart illustrating a sub-optimal search algorithm that reduces the computational complexity of the power control bit correction algorithm illustrated in FIG. 2. The method illustrated in FIG. 6 identifies the suspicious power control commands and changes each suspicious power control command one at a time. The changed power control command that result in the lower mean squared error is then fixed and the remaining suspicious power control commands are changed to determine the change that results in the greatest reduction in the energy between the received frame and the synthesized frame.

In block 300, the K power control commands that are identified to be most likely in error are identified. In block 302, K synthesized power control groups are generated. In block 304, the mean squared error between the synthesized power control groups and the received signal is computed for each of the K power control group hypotheses in accordance with equation (4) above.

In block 306, the synthesized power control group with the lowest mean squared error is selected. In block 308, the original frame is set to be equal to the selected synthesized frame. In block 308 the power control command that was changed in the selected synthesized frame is fixed and the received frame of data is replaced with the selected synthesized frame. In block 310, the power control command that was changed in the selected synthesized frame is eliminated from the list of suspicious power control commands.

Control block 312 tests to determine whether the maximum number of iterations has been reached. If the maximum number of iterations has been reached, then the process is halted and the adjusted power control command set selected. If the maximum number of iterations has not been reached, then the process moves to block 316 where the number of suspicious commands to be searched is reduced by one. The process then proceeds to block 302 and the operation proceeds as described previously.

It should be noted that although the previous descriptions are based on the traffic energies the process can be performed on the punctured power control bits alone.

Figure 4:
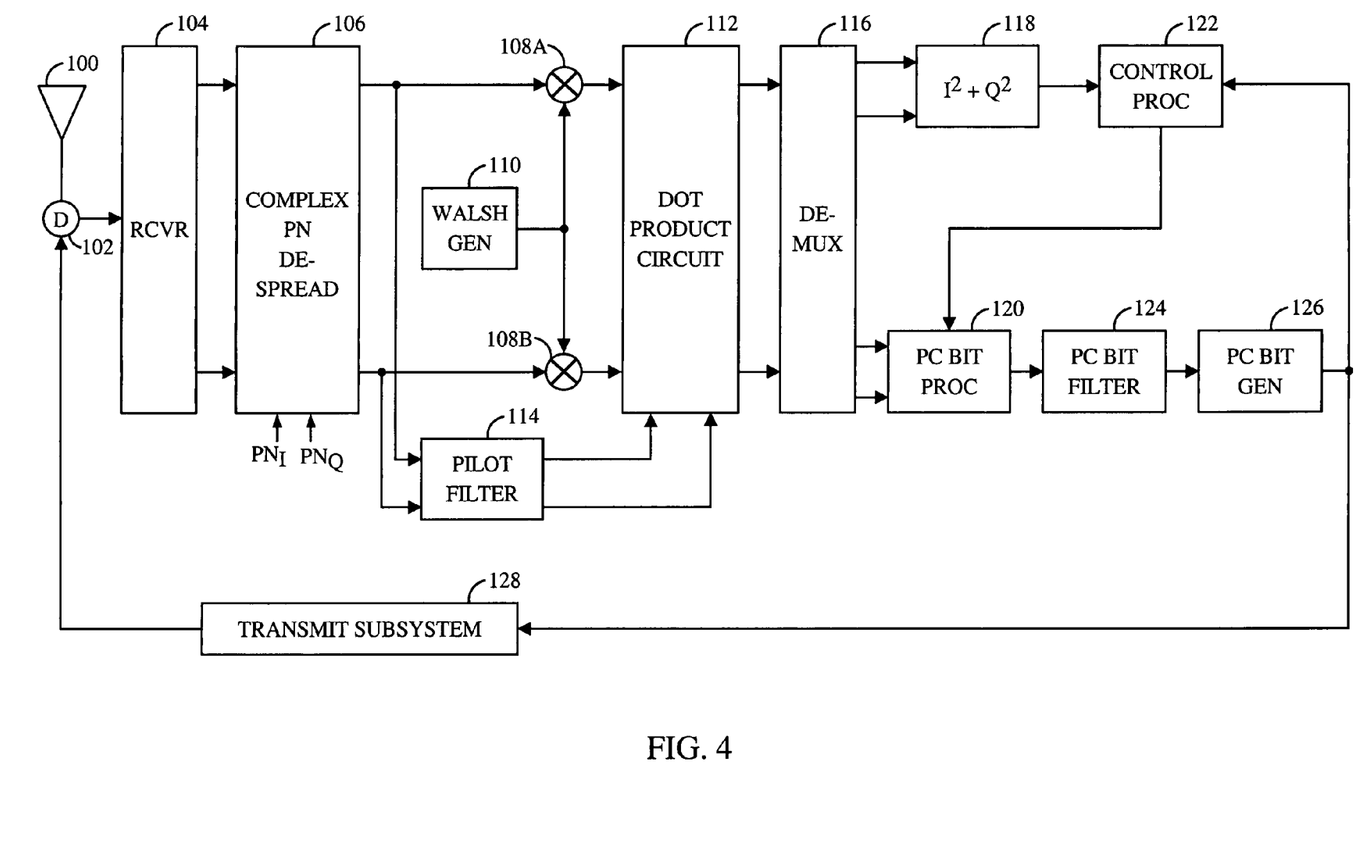
FIG. 4 is a block diagram illustrating the mobile station of the first exemplary embodiment of the present invention wherein the power control commands are generated in accordance with systematically corrected power control commands.

FIG. 4 illustrates the mobile station incorporating the power control command generation system of the present invention. Signals are received at antenna 100 and provided through duplexer 102 to receiver 104. Receiver 104 down converts, filters and amplifies the received signal in accordance with a QPSK demodulation format. The in-phase and quadrature components of the demodulated signals are provided to complex PN De-Spreader 106.

Complex PN De-Spreader 106 despreads the received signal in accordance with the pseudonoise sequences PNI and PNQ. The PN despread signals are provided to a first input of orthogonal despreaders 108a and 108b and to pilot filter 114. In the exemplary embodiment, where Walsh (0) is used to cover the pilot symbols, pilot filter 114 can simply be a low pass filter. In cases where other Walsh sequences are used to cover the pilot symbols the Walsh covering is removed by pilot filter 114.

Walsh sequence generator 110 generates a replica of the orthogonal sequence used to cover the traffic channel and provides the sequence to a second input of orthogonal despreaders 108a and 108b. Orthogonal despreaders 108a and 108b remove the traffic channel Walsh covering and provide the result to dot product circuit 112. Dot product circuit 112 computes the dot product of the uncovered traffic channel and the pilot channel to remove phase ambiguities from the received signal.

The resulting scalar sequence on the I and Q channels are provided to de-multiplexer 116. De multiplexer 116 removes the received power control bits from the received signals and provides those bits to power control bit processor 120. The traffic signals are provided to energy computation means 118 which squares the amplitude samples and sums the results to yield a value indicative of the energy of the demodulated signal. The energy of the signal for a particular power control group is provided to control processor 122.

Control processor 122 performs the computations described in block 50, 52, 54 and 56 of FIG. 1. Control processor 122 provides a signal indicative of the correction to the energies of the received power control symbols to power control bit processor 120. Power control bit processor 120 adjusts the energies of the previously received power control bits. And provides a signal indicative of the adjusted energies to power control bit filter 124.

Power control bit processor 120 provides a signal indicative of the adjusted power control bit energies to power control bit filter 124. Power control bit filter 124 combines the adjusted energies of the power control bits (Pi) in accordance with the equation:

$$P = \sum_{i=1}^{N} \omega_i P_i, \quad (4)$$

where $\omega_i$ is a weighting function. This computed energy is then compared against a threshold in power control bit generator 126. If the average adjusted energy of the power control bit sequence is less than the threshold then a power control command indicating that the base station should increase the transmission energy of the traffic channel is generated. If the average adjusted energy of the power control bit sequence is greater than the threshold then a power control command indicating that the base station should decrease the transmission energy of the traffic channel is generated.

The generated power control command is provided to transmit subsystem 128 which combines the power control bit with the reverse link signal and provides the signal through duplexer 102 for transmission to base station 1 through antenna 100.

II. Traffic Weighting of Power Control Bits

In a second method for providing an averaged value of the power control bit energies, the power control bits are weighted and averaged in accordance with the energy of the traffic in the power control group. This method makes no attempt to determine whether the power control commands were received correctly or even the size of the step. Thus, this second embodiment is particularly robust. The second embodiment, weights the energy of the power control symbols in accordance with the received energy of the traffic data. In its simplest form this is realized by a moving average filter. In this second embodiment, the rate of the traffic signal must not change over the filtering window. Thus, if the rate of the traffic data can change only on frame boundaries, the filtering operation must be performed on power control groups within a given frame. In a system where the rate changes on frame boundaries, the filter must reset on frame boundaries.

The filtered power control bit energy for the Nth power control group ($\hat{P}_N$) is determined in accordance:

$$\hat{P}_N = \sum_{i=1}^{N} \beta_i \left(\frac{T_N}{T_i}\right) P_i, \quad (5)$$

where $T_i$ is the traffic energy for ith power control group, $T_N$ is the traffic energy for Nth power control group, $P_i$ is the power control bit energy of the ith power control group, and $\beta$ is a weighting function.

$$\beta_i = \frac{T_i}{\sum_{n=1}^{N} T_n}, \quad (6)$$

which leads to:

$$\hat{P}_N = \frac{T_N \sum_{i=1}^{N} P_i}{\sum_{i=1}^{N} T_i}, \quad (7)$$

and a further improvement is to use the least squares estimate of the final traffic energy:

$$\hat{P}_N = \frac{(T_N)_{least\ sq.\ estimate} \sum_{i=1}^{N} P_i}{\sum_{i=1}^{N} T_i} \quad (8)$$

Figure 5:
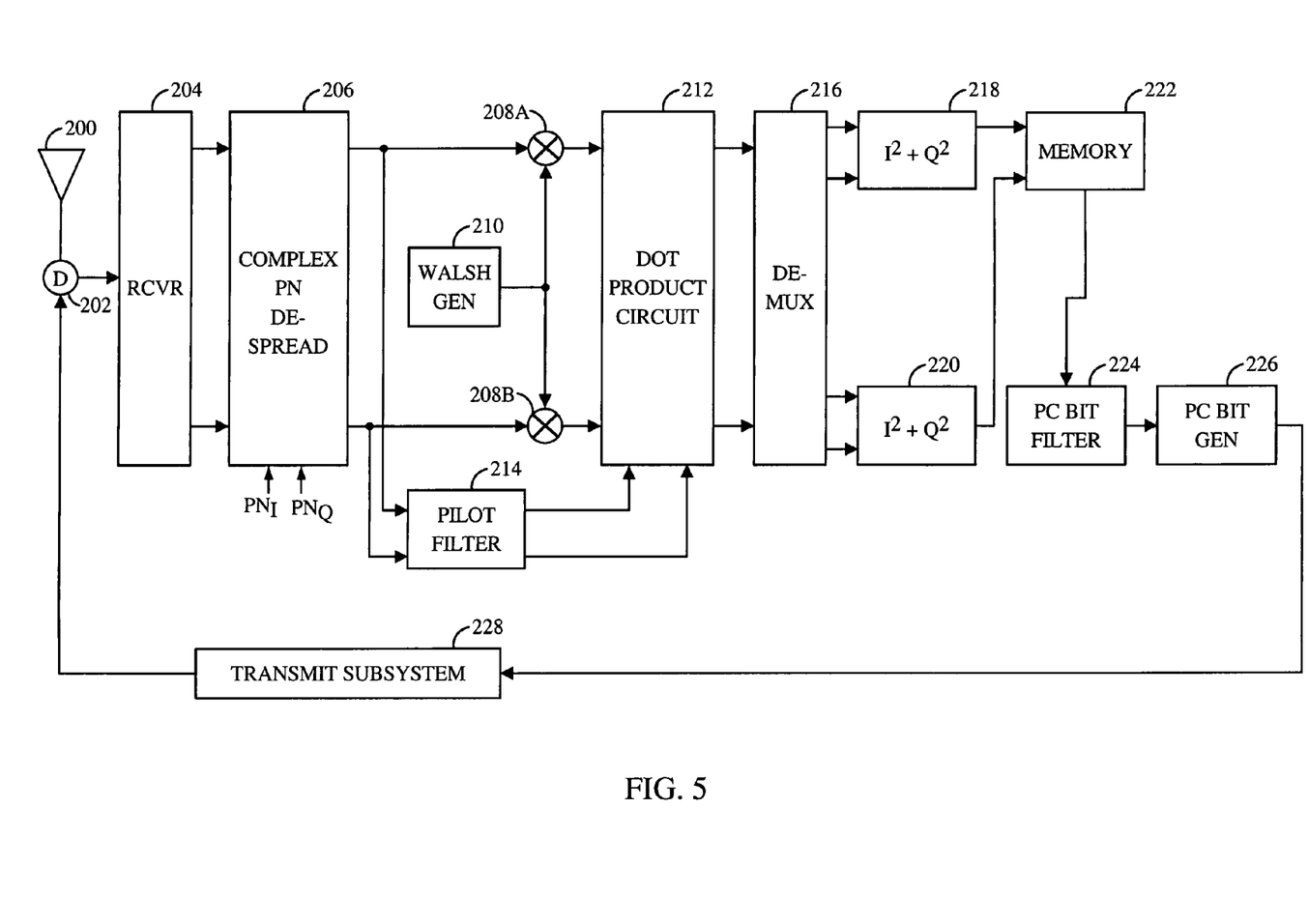
FIG. 5 is a block diagram illustrating the mobile station of the second exemplary embodiment of the present invention wherein the power control commands are generated in accordance with energy weighted power control commands.

In the exemplary embodiment, the forward link signal is generated as described with respect to FIG. 1. In FIG. 5, signals are received at antenna 200 and provided through duplexer 202 to receiver 204. Receiver 204 down converts, filters and amplifies the received signal in accordance with a QPSK demodulation format. The in-phase and quadrature components of the demodulated signals are provided to complex PN De-Spreader 206.

Complex PN De-Spreader 206 despreads the received signal in accordance with the pseudonoise sequences PNI and PNQ. The PN despread signals are provided to a first input of orthogonal despreaders 208a and 208b and to pilot filter 214. In the exemplary embodiment, where Walsh (0) is used to cover the pilot symbols, pilot filter 214 can simply be a low pass filter. In cases where other Walsh sequences are used to cover the pilot symbols the Walsh covering is removed by pilot filter 214.

Walsh sequence generator 210 generates a replica of the orthogonal sequence used to cover the traffic channel and provides the sequence to a second input of orthogonal despreaders 208a and 208b. Orthogonal despreaders 208a and 208b remove the traffic channel Walsh covering and provide the results to dot product circuit 212. Dot product circuit 212 computes the dot product of the uncovered traffic channel and the pilot channel to remove phase ambiguities from the received signal.

The resulting scalar sequences on the I and Q channels are provided to de-multiplexer 216. De multiplexer 216 removes the received power control bits from the received signals and provides those bits to power control bit energy calculator 220. Power control bit energy calculator 220 computes the squares of the amplitudes of the received power control bit on the I and Q channels and sums the two energy values. The power control bit energy is then stored in memory element 222.

The traffic signals are provided to traffic energy calculator 218 which squares the amplitude of the traffic samples and sums the results to yield a value indicative of the energy of the demodulated signal. The energy of the traffic signal for each power control group in the frame is provided to and stored in memory 222.

Memory 222 provides the energy of the power control bits and the traffic channel energy for each power control group in the frame to power control bit filter 224. Power control bit filter computes a filtered power control bit energy value in accordance with equation (5) above. The filtered power control bit energy is provided to power control bit generator 226.

The filtered power control bit energy is compared against a predetermined energy threshold in power control bit generator 226. If the filtered power control bit energy is less than the threshold then a power control command indicating that the base station should increase the transmission energy of the traffic channel is generated. If the filtered power control bit energy is greater than the threshold then a power control command indicating that the base station should decrease the transmission energy of the traffic channel is generated.

The generated power control command is provided to transmit subsystem 228 which combines the power control bit with the reverse link signal and provides the signal through duplexer 202 for transmission to base station 1 through antenna 200.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A power control system configured to control transmission energy of a first type of data and a second type of data punctured into the first type of data, comprising:
   an input that receives the first type of data and the second type of data;
   a decoder that separates the second type of data from the first type of data;
   an energy measurement circuit that measures energy of the second type of data;
   a power control processor that receives an indication of the energy of the second type of data and generates a power control command for the transmission energy of the first type of data based on the indication of the energy of the second type of data;

transmission means for transmitting the power control command;

a filter that filters a plurality of the received power control commands to provide an improved estimate of the received energy of the power control commands;

power control bit processor that adjusts the energies of the received power control commands to compensate for energy adjustments made at the transmitter in response to a set of previously transmitted power control commands, wherein the power control processor estimates the most likely sequence of power control commands responded to by the transmitter, and adjusts the energies of the received power control commands to compensate for energy adjustments made at the transmitter in response to the estimates the power control commands received by the transmitter, and wherein the power control processor estimate the most likely sequence of power control commands responded to by the transmitter by comparing changes in the received energy of the received power control commands against expected changes in those commands, based on the set of previously transmitted power control commands, identifying suspicious responses to the previously transmitted power control commands and testing a set of hypotheses of receive power control commands in accordance with the identified suspicious responses.

2. A power control system configured to control transmission energy of a first type of data and a second type of data punctured into the first type of data, comprising:

an input that receives the first type of data and the second type of data;

a decoder that separates the second type of data from the first type of data;

an energy measurement circuit that measures energy of the second type of data;

a power control processor that receives an indication of the energy of the second type of data and generates a power control command for the transmission energy of the first type of data based on the indication of the energy of the second type of data, wherein the transmission energy of the first type of data is varied based on the rate of the first type of data, and wherein the transmission energy of the second type of data does not vary based on the rate of the first type of data, and wherein the first type of data comprises variable rate traffic data and wherein the second type of data comprises power control commands;

a filter that filters a set of the second type of data over a plurality of received frames to provide an improved estimate of the received energy of the second type of data;

a processor that adjusts the energies of the second type of data to compensate for energy adjustments made at the transmitter in response to a set of previously transmitted power control commands, the processor estimates a most likely sequence of power control commands responded to by the transmitter, and adjusts the energies of the set of the second type of data over a plurality of received frames to compensate for energy adjustments made at the transmitter in response to the estimates the power control commands received by the transmitter, wherein the power control processor estimates the most likely sequence of power control commands responded to by the transmitter by:

comparing changes in the received energy of the received power control commands against expected changes in those commands based on the set of previously transmitted power control commands;

identifying suspicious responses to the previously transmitted power control commands; and testing a set of hypotheses of receive power control commands in accordance with the identified suspicious responses.

3. A power control system configured to control transmission energy of a first type of data and a second type of data punctured into the first type of data, comprising:

an input that receives the first type of data and the second type of data;

a decoder that separates the second type of data from the first type of data;

an energy measurement circuit that measures energy of the second type of data;

a power control processor that receives an indication of the energy of the second type of data and generates a power control command for the transmission energy of the first type of data based on the indication of the energy of the second type of data;

transmission means for transmitting the power control command;

a filter that filters a plurality of the received power control commands to provide an improved estimate of the received energy of the power control commands and wherein the filter means generates a filtered power control bit energy in accordance with the equation:

$$\hat{P}_N = \sum_{i=1}^{N} \beta_i \left(\frac{T_N}{T_i}\right) P_i,$$

where $T_i$ is the traffic energy for ith power control group, $P_i$ is the power control bit energy of the ith power control group, and $\beta$ is a weighting function.

4. The power control system of claim 3 wherein the weighting function, $\beta_i$, is determined in accordance with the equation:

$$\beta_i = \frac{T_i}{\sum_{n=1}^{N} T_n}.$$

5. A method for controlling transmission energy of a first type of data and a second type of data punctured into the first type of data, comprising:

receiving the first type of data and the second type of data;

separating the second type of data from the first type of data;

measuring energy of the second type of data, and generating an indication of the energy of the second type of data;

generating a power control command for the transmission energy of the first type of data responsive to the indication of the energy of the second type of data;

transmitting the power control command;

filtering the measured energy of a plurality of the received power control symbols to provide an improved estimate of the received energy of the power control symbols;

adjusting the energies of the received power control symbols to compensate for energy adjustments made at the transmitter in response to a set of previously transmitted power control commands;

estimating the most likely sequence of power control commands responded to by the transmitter;
compensating for energy adjustments made at the transmitter in the estimates the power control commands received by the transmitter;
wherein estimating the most likely sequence of power control commands, comprises:
comparing changes in the received energy of the received power control commands against expected changes in those commands based on the set of previously transmitted power control commands;
identifying suspicious responses to the previously transmitted power control commands; and
testing a set of hypotheses of receive power control commands in accordance with the identified suspicious responses.

6. A method for controlling transmission energy of a first type of data and a second type of data punctured into the first type of data, comprising:
receiving the first type of data and the second type of data;
separating the second type of data from the first type of data;
measuring energy of the second type of data, and generating an indication of the energy of the second type of data, wherein the transmission energy of the first type of data is varied based on the rate of the first type of data, and wherein the transmission energy of the second type of data does not vary based on the rate of the first type of data, and wherein the first type of data comprises variable rate traffic data and wherein the second type of data comprises power control symbols;
generating a power control command for the transmission energy of the first type of data responsive to the indication of the energy of the second type of data;
filtering a set of the second type of data over a plurality of received frames to provide an improved estimate of the received energy of the second type of data;
adjusting the energies of the second type of data to compensate for energy adjustments made in response to a set of previously transmitted power control commands;
estimating a most likely sequence of power control commands responded to by the transmitter;
estimating the power control commands received;
adjusting the energies of the set of the second type of data over a plurality of received frames to compensate for energy adjustments made responsive to the estimates the power control commands received by the transmitter;
wherein the estimating the power control commands received by the transmitter, comprises:
comparing changes in the received energy of the received power control commands against expected changes in those commands based on the set of previously transmitted power control commands;
identifying suspicious responses to the previously transmitted power control commands; and
testing a set of hypotheses of receive power control commands in accordance with the identified suspicious responses.

7. A method for controlling transmission energy of a first type of data and a second type of data punctured into the first type of data, comprising:
receiving the first type of data and the second type of data;
separating the second type of data from the first type of data;
measuring energy of the second type of data, and generating an indication of the energy of the second type of data;
generating a power control command for the transmission energy of the first type of data responsive to the indication of the energy of the second type of data;
transmitting the power control command;
filtering a plurality of the received power control commands to provide an improved estimate of the received energy of the power control commands and wherein the filter means generates a filtered power control bit energy in accordance with the equation:

$$\hat{P}_N = \sum_{i=1}^{N} \beta_i \left( \frac{T_N}{T_i} \right) P_i,$$

where $T_i$ is the traffic energy for ith power control group, $P_i$ is the power control bit energy of the ith power control group, and $\beta$ is a weighting function.

8. The method of claim 7 wherein the weighting function, $\beta_{\square}$, is determined in accordance with the equation:

$$\beta_i = \frac{T_i}{\sum_{n=1}^{N} T_n}.$$

9. A power control system configured to control transmission energy of variable rate traffic data and a power control commands punctured into the variable rate traffic data, comprising:
a receiver that receives the variable rate traffic data and the power control commands;
a decoder that separates the second type of data from the first type of data;
an energy measurement circuit that measures energy of the second type of data;
a power control processor that receives an indication of the energy of the power control commands and generates a power control command for the transmission energy of the variable rate traffic data based on the indication of the energy of the power control commands, wherein the power control processor estimates the power control commands received by a transmitter and adjusts the energies of the received power control commands to compensate for energy adjustments made at the transmitter in response to the estimates the power control commands received by the transmitter;
transmission means for transmitting the power control command;
a filter that filters a plurality of the received power control commands to provide an improved estimate of the received energy of the power control commands; and
power control bit processor that adjusts the energies of the received power control commands to compensate for energy adjustments made at the transmitter in response to a set of previously transmitted power control commands;
wherein the power control processor estimates the most likely sequence of power control commands responded to by a transmitter by:
comparing changes in the received energy of the received power control commands against expected changes in those commands based on the set of previously transmitted power control commands;

identifying suspicious responses to the previously transmitted power control commands; and testing a set of hypotheses of receive power control commands in accordance with the identified suspicious responses.

10. A power control system configured to control transmission energy of variable rate traffic data and a power control commands punctured into the variable rate traffic data, comprising:

a receiver that receives the variable rate traffic data and the power control commands;

a decoder that separates the second type of data from the first type of data;

an energy measurement circuit that measures energy of the second type of data, wherein the transmission energy of the variable rate traffic data is varied based on the rate of the variable rate traffic data, and wherein the transmission energy of the power control commands does not vary based on the rate of the variable rate traffic data;

a power control processor that receives an indication of the energy of the power control commands and generates a power control command for the transmission energy of the variable rate traffic data based on the indication of the energy of the power control commands;

a filter that filters a set of the power control commands over a plurality of received frames to provide an improved estimate of the received energy of the power control commands;

a processor that adjusts the energies of the power control commands to compensate for energy adjustments made at the transmitter in response to a set of previously transmitted power control commands, wherein the processor estimates the power control commands received by the transmitter and adjusts the energies of the set of the power control commands over a plurality of received frames to compensate for energy adjustments made at the transmitter in response to the estimates the power control commands received by the transmitter;

wherein the power control processor estimates the most likely sequence of power control commands responded to by the transmitter by:

comparing changes in the received energy of the received power control commands against expected changes in those commands based on the set of previously transmitted power control commands;

identifying suspicious responses to the previously transmitted power control commands; and testing a set of hypotheses of receive power control commands in accordance with the identified suspicious responses.

11. The power control system of claim 10, further comprising:

a filter that filters a plurality of the received power control commands to provide an improved estimate of the received energy of the power control commands and wherein the filter means generates a filtered power control bit energy in accordance with the equation:

$$\hat{P}_N = \sum_{i=1}^{N} \beta_i \left(\frac{T_N}{T_i}\right) P_i,$$

where $T_i$ is the traffic energy for ith power control group, $P_i$ is the power control bit energy of the ith power control group, and $\beta$ is a weighting function.

12. The power control system of claim 11 wherein the weighting function, $\beta\cdot$, is determined in accordance with the equation:

$$\beta_i = \frac{T_i}{\sum_{n=1}^{N} T_n}.$$

13. A method for controlling transmission energy of variable rate traffic data and power control commands punctured into the variable rate traffic data, comprising:

receiving the variable rate traffic data and the power control commands;

separating the second type of data from the first type of data;

measuring energy of the second type of data, and generating an indication of the energy of the power control commands;

generating a power control command for the transmission energy of the variable rate traffic data responsive to the indication of the energy of the power control commands;

transmitting the power control command;

filtering the measured energy of a plurality of the received power control symbols to provide an improved estimate of the received energy of the power control symbols;

adjusting the energies of the received power control symbols to compensate for energy adjustments made at the transmitter in response to a set of previously transmitted power control commands; and estimating the most likely sequence of power control commands responded to by the transmitter.

14. The method of claim 13, further comprising:

compensating for energy adjustments made at the transmitter in response to the estimates the power control commands received by the transmitter.

15. The method of claim 14 wherein estimating the most likely sequence of power control commands, comprises:

comparing changes in the received energy of the received power control commands against expected changes in those commands based on the set of previously transmitted power control commands;

identifying suspicious responses to the previously transmitted power control commands; and testing a set of hypotheses of receive power control commands in accordance with the identified suspicious responses.

16. A method for controlling transmission energy of variable rate traffic data and power control commands punctured into the variable rate traffic data, comprising:

receiving the variable rate traffic data and the power control commands;

separating the second type of data from the first type of data;

measuring energy of the second type of data, and generating an indication of the energy of the power control commands;

generating a power control command for the transmission energy of the variable rate traffic data responsive to the indication of the energy of the power control commands, wherein the transmission energy of the variable rate traffic data is varied based on the rate of the variable rate traffic data, and wherein the transmission energy of the power control commands does not vary based on the rate of the variable rate traffic data;

filtering a set of the power control commands over a plurality of received frames to provide an improved estimate of the received energy of the power control commands;

adjusting the energies of the power control commands to compensate for energy adjustments made in response to a set of previously transmitted power control commands;

estimating a most likely sequence of power control commands responded to by the transmitter;

estimating the power control commands received; and adjusting the energies of the set of the power control commands over a plurality of received frames to compensate for energy adjustments made responsive to the estimates the power control commands received by the transmitter;

wherein estimating the power control commands received by the transmitter, comprises:

comparing changes in the received energy of the received power control commands against expected changes in those commands based on the set of previously transmitted power control commands;

identifying suspicious responses to the previously transmitted power control commands; and testing a set of hypotheses of receive power control commands in accordance with the identified suspicious responses.

17. A method for controlling transmission energy of variable rate traffic data and power control commands punctured into the variable rate traffic data, comprising:

receiving the variable rate traffic data and the power control commands;

separating the second type of data;

measuring energy of the second type of data, and generating an indication of the energy of the power control commands;

generating a power control command for the transmission energy of the variable rate traffic data responsive to the indication of the energy of the power control commands; and filtering a plurality of the received power control commands to provide an improved estimate of the received energy of the power control commands and wherein the filter means generates a filtered power control bit energy in accordance with the equation:

$$\hat{P}_N = \sum_{i=1}^{N} \beta_i \left(\frac{T_N}{T_i}\right) P_i,$$

where $T_i$ is the traffic energy for ith power control group, $P_i$ is the power control bit energy of the ith power control group, and $\beta$ is a weighting function.

18. The method of claim 17 wherein the weighting function, $\beta \bullet$, is determined in accordance with the equation:

$$\beta_i = \frac{T_i}{\sum_{n=1}^{N} T_n}.$$

* * * * *